(12) United States Patent
Debski

(10) Patent No.: US 9,068,874 B2
(45) Date of Patent: Jun. 30, 2015

(54) CONTAINER FOR A FLUID WITH ADJUSTABLE DOSAGE

(75) Inventor: Edward Hendrik Debski, Enschede (NL)

(73) Assignee: Bark Innovations B.V., Eerbeek (NL)

( * ) Notice: Subject to any disclaimer, the term of this patent is extended or adjusted under 35 U.S.C. 154(b) by 67 days.

(21) Appl. No.: 13/989,535

(22) PCT Filed: Nov. 16, 2011

(86) PCT No.: PCT/NL2011/050782
§ 371 (c)(1),
(2), (4) Date: May 24, 2013

(87) PCT Pub. No.: WO2012/078038
PCT Pub. Date: Jun. 14, 2012

(65) Prior Publication Data
US 2013/0240573 A1    Sep. 19, 2013

(30) Foreign Application Priority Data

Nov. 25, 2010    (NL) .................................. 1038405

(51) Int. Cl.
*G01F 11/28*    (2006.01)
*G01F 11/26*    (2006.01)
*B65D 25/48*    (2006.01)
*B65D 47/12*    (2006.01)

(52) U.S. Cl.
CPC .............. *G01F 11/26* (2013.01); *G01F 11/262* (2013.01); *G01F 11/268* (2013.01); *B65D 25/48* (2013.01); *B65D 47/123* (2013.01)

(58) Field of Classification Search
CPC .............. G01F 11/262–11/263; G01F 11/286; G01F 11/26; G01F 11/32; G01F 11/268; B65D 47/123; B65D 25/48

USPC .............. 222/424.5, 434, 438, 439, 444–448, 222/452, 454, 456
See application file for complete search history.

(56) References Cited

U.S. PATENT DOCUMENTS 1,914,766 A  *  6/1933  Zaloschan ...................... 222/452
2,387,374 A  * 10/1945  Watters .......................... 222/455
2,864,538 A  * 12/1958  Rasmussen .................... 222/453
2,980,302 A  *  4/1961  Rasmussen .................... 222/453

(Continued)

FOREIGN PATENT DOCUMENTS

EP    0335505 A1    10/1989
EP    0407285 A1     1/1991

(Continued)

*Primary Examiner* — Paul R Durand
*Assistant Examiner* — Randall Gruby
(74) *Attorney, Agent, or Firm* — The Webb Law Firm

(57) ABSTRACT

The invention relates to a container for a fluid, the container comprising: a storage compartment with a passage opening; a dosing compartment with a closable pouring opening and with an inflow opening arranged on the passage opening of the storage compartment; a conduit arranged between the inflow opening and the pouring opening of the dosing compartment, wherein at least one opening is arranged in the wall of the conduit; an adjusting part arranged in the conduit for at least partially closing the at least one opening in the conduit wall such that the distance between the inflow opening of the dosing compartment and the part of the least one opening left clear can be varied; and operating means for operating the adjusting part, wherein the operating means are arranged on the outer side of the container.

16 Claims, 3 Drawing Sheets

(56) References Cited

U.S. PATENT DOCUMENTS

| | | | |
|---|---|---|---|
| 3,237,816 A | 3/1966 | Anderson | |
| 3,288,335 A * | 11/1966 | Steffens et al. | 222/455 |
| 3,730,387 A * | 5/1973 | McConnell et al. | 221/265 |
| 4,143,794 A * | 3/1979 | Stratford et al. | 222/42 |
| 4,151,934 A * | 5/1979 | Saeki | 222/437 |
| 4,429,815 A * | 2/1984 | Libit | 222/452 |
| 4,474,312 A * | 10/1984 | Donoghue | 222/205 |
| 4,632,264 A * | 12/1986 | Evans | 215/220 |
| 4,684,046 A * | 8/1987 | Foster et al. | 222/451 |
| 4,747,521 A * | 5/1988 | Saffron | 222/205 |
| 4,778,087 A | 10/1988 | Desai | |
| 4,807,785 A * | 2/1989 | Pritchett | 222/442 |
| 4,830,226 A | 5/1989 | Kong | |
| 4,951,839 A * | 8/1990 | Kong | 222/47 |
| 4,958,749 A * | 9/1990 | Kuenzel et al. | 222/133 |
| 5,020,699 A * | 6/1991 | Sams | 222/450 |
| 5,358,152 A * | 10/1994 | Banks | 222/442 |
| 5,392,966 A * | 2/1995 | Bunin | 222/454 |
| 5,407,104 A * | 4/1995 | Santagiuliana | 222/425 |
| 5,584,420 A | 12/1996 | Awada et al. | |
| 6,227,418 B1 * | 5/2001 | Loertscher | 222/438 |
| 6,330,960 B1 | 12/2001 | Faughey et al. | |
| 6,357,627 B1 * | 3/2002 | Pasbrig et al. | 222/81 |
| 6,394,317 B1 * | 5/2002 | Faughey et al. | 222/309 |
| 6,478,058 B1 * | 11/2002 | Pears | 141/353 |
| 6,892,905 B2 * | 5/2005 | Cousseau | 222/438 |
| 7,097,071 B2 * | 8/2006 | Anderson et al. | 222/1 |
| 8,371,470 B2 * | 2/2013 | Druyan | 220/501 |
| 8,757,448 B2 * | 6/2014 | Aviram | 222/157 |
| 8,758,322 B2 * | 6/2014 | McCoy et al. | 604/403 |
| 2002/0070233 A1 * | 6/2002 | Angelos | 222/109 |
| 2003/0136187 A1 * | 7/2003 | Cousseau | 73/149 |
| 2010/0193526 A1 * | 8/2010 | Druyan | 220/529 |
| 2012/0248153 A1 * | 10/2012 | Peng | 222/454 |
| 2014/0197209 A1 * | 7/2014 | Debski | 222/454 |

FOREIGN PATENT DOCUMENTS

| | | |
|---|---|---|
| WO | 8903362 A1 | 4/1989 |
| WO | 0136920 A1 | 5/2001 |

* cited by examiner

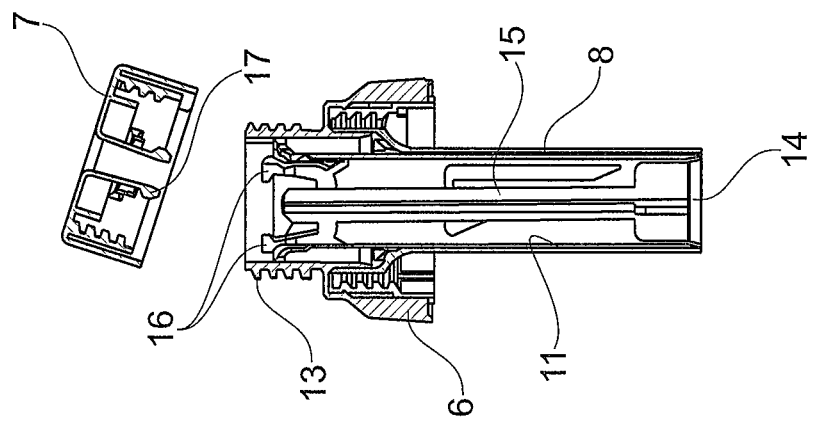
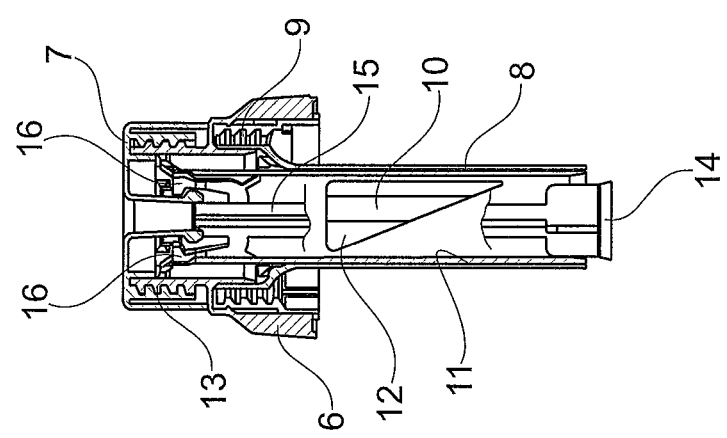
Fig. 3
Fig. 2

CONTAINER FOR A FLUID WITH ADJUSTABLE DOSAGE

BACKGROUND OF THE INVENTION

1. Field of the Invention

The invention relates to a container for a fluid. The invention relates particularly to containers with a dosage option for the purpose of enabling dosage of an appropriate quantity of fluid, such as for instance concentrated cleaning agent.

2. Description of Related Art

In the case of prior art containers the possibility of a correct dosage greatly depends on the competence of the user. In the case of such known containers the container must be held in a determined position or it is necessary to squeeze or press the container in order to dispense a determined quantity. In the case of some products an incorrect dosage will in fact have a negative effect on the action of the product.

In order to solve these problems separate components, such as measuring cups and the like, are often included to enable dosage of a correct quantity. These components must however be cleaned after use. More fluid than necessary hereby enters the environment.

Described in WO 89 03362 is a container with a dosage option. A dosing compartment is arranged here on a storage compartment. Arranged in the dosing compartment is a conduit which runs from the storage compartment to the pouring opening. Openings are provided at different heights in the wall of the conduit. Provided in the conduit is an adjusting part with which the openings can be opened and closed one by one.

When this container is now held upside down, fluid will flow out of the storage compartment into the dosing compartment. The container is then placed upright again, after which the dosing compartment will empty up to the level of the opened opening in the conduit. A fixed measured quantity is hereby obtained.

The drawback of this prior art container is that the adjusting part is arranged in the conduit along which the fluid runs during pouring. During setting of the measured quantity contact will be made with the fluid, which in some cases may be harmful to health. It is also possible to use a tool, although the tool will become contaminated with the fluid. This tool must later also be cleaned.

In addition, the container has to be opened in order to reach the adjusting part. This entails the risk during adjustment of the adjusting part of the container accidentally tipping over, with the possibility of fluid then flowing out of the container.

It is now an object of the invention to reduce or even obviate the above stated drawbacks.

SUMMARY OF THE INVENTION

This object is achieved according to the invention with a container, comprising:
- a storage compartment with a passage opening;
- a dosing compartment with a closable pouring opening and with an inflow opening arranged on the passage opening of the storage compartment;
- a conduit arranged between the inflow opening and the pouring opening of the dosing compartment, wherein at least one opening is arranged in the wall of the conduit;
- an adjusting part arranged in the conduit for at least partially closing the at least one opening in the conduit wall such that the distance between the inflow opening of the dosing compartment and the part of the at least one opening left clear can be varied; and
- operating means for operating the adjusting part, wherein the operating means are arranged on the outer side of the container.

In the container according to the invention the operating means are arranged on the outer side of the container. The operating means no longer lie here in the part of the container coming into contact with the fluid. It is thus possible to set the measured quantity without coming into contact with the fluid. In addition, the container itself can remain closed, whereby there is no risk of fluid being spilt unnecessarily during setting of the measured quantity.

In a preferred embodiment of the container according to the invention the conduit is a first cylindrical tube and the adjusting part is a second cylindrical tube lying against the inner side of the first tube.

By providing an opening in both the first tube and the second tube the form of the opening can be changed by rotating the second tube relative to the first tube, whereby the outflow level of the dosing compartment can be modified. It is thus possible to set a continuously variable measured quantity.

Preferably however, a number of openings are arranged in the wall of the first tube at different distances from the inflow opening and in the wall of the second tube are arranged corresponding openings which can be placed in line with the openings in the first tube.

Using this embodiment it is possible to select a number of fixed measured quantities.

In a preferred embodiment of the container according to the invention the operating means comprise an adjusting ring arranged around the pouring opening. Using this ring a user can easily select the correct dosage from outside without coming into contact with the fluid. An indication can further be arranged on the ring for easy selection of the correct position of the ring for a desired measured quantity.

In another embodiment of the container according to the invention a cap is arranged on the adjusting ring for the purpose of closing the pouring opening.

In another preferred embodiment of the container according to the invention co-acting protrusions are arranged on the inner side of the ring and around the pouring opening for holding the adjusting ring in a set position, and the adjusting ring is deformable in order to disengage the protrusions from each other.

The co-acting protrusions can, after setting of the correct measured quantity, prevent the setting being accidentally modified. Only when the adjusting ring is deformed, for instance by being squeezed, can the protrusions be disengaged from each other so that the adjusting ring can be rotated.

Yet another preferred embodiment of the invention comprises closing means arranged in the inflow opening of the dosing compartment, which closing means are coupled to the closable pouring opening such that, when the pouring opening is opened, the inflow opening is closed and, when the pouring opening is closed, the inflow opening is opened.

These closing means prevent the possibility of fluid flowing from the storage compartment into the dosing compartment during pouring of a measured quantity. This could after all have an effect on the measured quantity.

In yet another embodiment of the container according to the invention the operating means are lockable in order to provide the container with a preset measured quantity.

Using this embodiment it is for instance possible for a manufacturer to use a standard dosing compartment and to set this compartment to a fixed measured quantity during the manufacturing process. The dosing compartment can thus be set to a large dosage for a first fluid, while with the same dosing compartment a small dosage can be set for a second fluid.

BRIEF DESCRIPTION OF THE DRAWINGS

These and other features according to the invention are further elucidated with reference to the accompanying drawings.

FIG. 2 is a cross-sectional view of the cap with dosage setting according to FIG. 1 in closed position.

FIG. 3 is a cross-sectional view of the cap with dosage setting according to FIG. 1 in opened position.

DETAILED DESCRIPTION OF THE INVENTION

Figure 1:
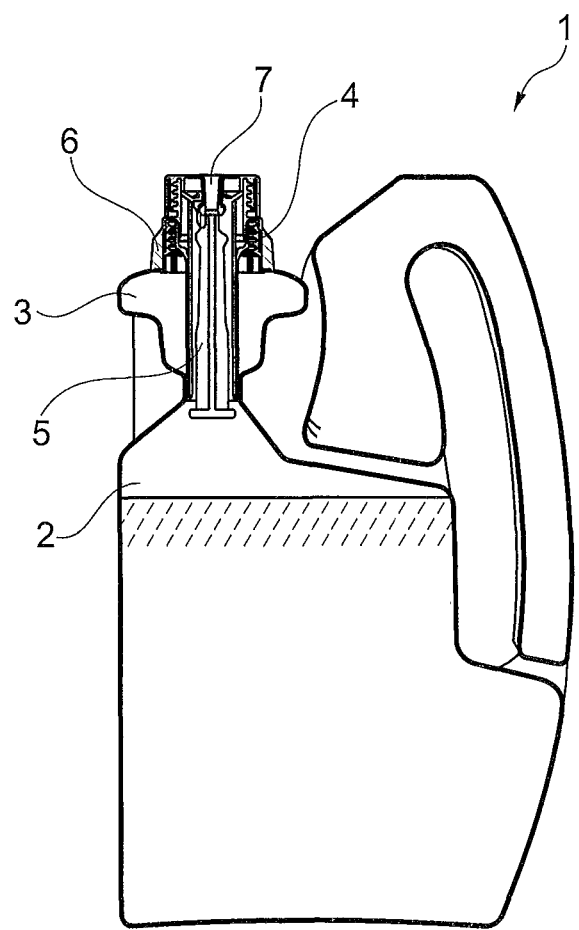
FIG. 1 is a cross-sectional view of an embodiment of the container according to the invention.

FIG. 1 shows an embodiment 1 of a container according to the invention. Container 1 has a storage compartment 2 with a dosing compartment 3 arranged thereon. Dosing compartment 3 has a pouring opening 4.

Formed between pouring opening 4 and the passage between storage compartment 2 and dosing compartment 3 is a conduit 5 which will be further elucidated hereinbelow.

An adjusting ring 6 is further arranged round pouring opening 4 for the purpose of setting the measured quantity. Placed on the dosage ring is a screw cap 7 with which container 1 can be closed.

The cap with dosage setting of FIG. 1 is shown in cross-Section No. in FIG. 2. Conduit 5 is formed by a cylindrical tube 8 arranged via screw thread 9 on pouring opening 4. An elongate opening 10 is provided in the wall of cylindrical tube 8.

Arranged in cylindrical tube 8 is a second cylindrical tube 11 which lies against the inner wall of tube 8. A triangular opening 12 is arranged in the wall of second tube 11. By rotating second tube 11 relative to first tube 8 the height of the opening resulting from openings 10 and 12 can be adjusted. This determines the level to which the fluid in dosing compartment 3 can flow away again and how much dosed fluid remains behind.

The second cylindrical tube 11 is connected to adjusting ring 6 arranged around pouring opening 4. Cap 7 is further tightened onto this adjusting ring 6 via screw thread 13. Second tube 11 can be rotated using adjusting ring 6, whereby the opening resulting from openings 10 and 12 can be modified.

In conduit 5 there is further a closing valve 14 for closing conduit 5 so that no fluid can flow from storage compartment 2 to dosing compartment 3. Closing valve 14 is connected to a coupling rod 15 and fingers 16 which are arranged thereon and which engage round a pin 17 protruding in cap 7.

When cap 7 is unscrewed from adjusting ring 6 (see FIG. 3), coupling rod 15 will be pulled upward until fingers 16 have sufficient space to release pin 17. At this moment closing valve 14 has closed conduit 5 and fluid can no longer flow out of storage compartment 2 into dosing compartment 3. This principle of co-displacement of a coupling rod during unscrewing and screwing-on of a cap can in principle be used per se for other applications.

Figure 4:
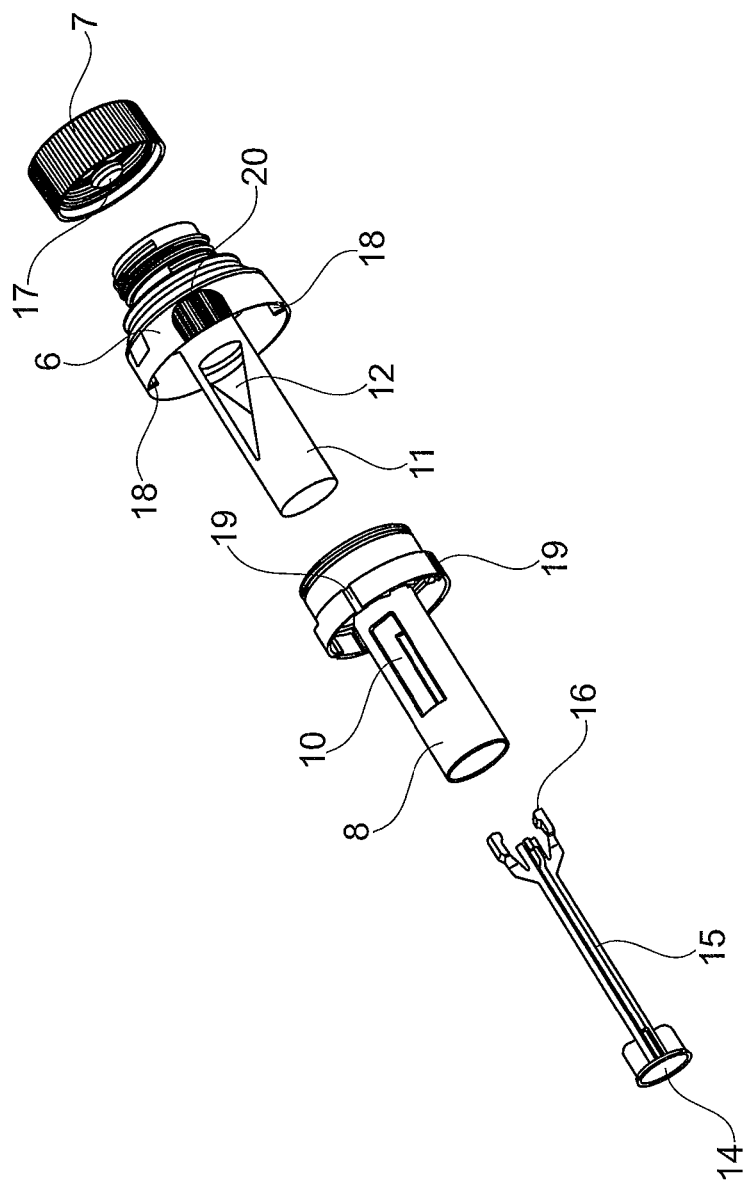
FIG. 4 shows an exploded view of the cap with dosage setting.

FIG. 4 shows the different components of the dosage setting with exploded parts. Shown clearly here is that ribs 18 which can engage in grooves 19 are arranged on the inner side of adjusting ring 6. By squeezing the adjusting ring 6 on the opposite pressing surfaces 20 the adjusting ring 6 will become oval, whereby ribs 18 release from the grooves and adjusting ring 6 can be rotated.

The invention claimed is:

1. A container for a fluid, the container comprising:
   (a) a storage compartment with a passage opening;
   (b) a dosing compartment with a closable pouring opening and with an inflow opening arranged on the passage opening of the storage compartment;
   (c) a conduit arranged between the inflow opening and the pouring opening of the dosing compartment, wherein at least one opening is arranged in the wall of the conduit;
   (d) an adjusting part arranged in the conduit for at least partially closing the at least one opening in the conduit wall such that the distance between the inflow opening of the dosing compartment and the part of the least one opening left clear can be varied;
   (e) an operator for operating the adjusting part, wherein the operator is arranged on the outer side of the container; and
   (f) a closing valve for closing the conduit, wherein the closing valve is connected to a coupling rod having fingers which engage a cap, wherein the cap is used for closing the pouring opening, such that when the cap is removed, the pouring opening is opened and the closing valve closes the conduit to the storage compartment and, when the cap is secured, the pouring opening is closed and the closing valve opens the conduit to the storage compartment.

2. The container as claimed in claim 1, wherein the conduit is a first cylindrical tube and wherein the adjusting part is a second cylindrical tube lying against the inner side of the first tube.

3. The container as claimed in claim 2, wherein the operator comprises an adjusting ring arranged around the pouring opening.

4. The container as claimed in claim 3, wherein the cap is arranged on the adjusting ring for the purpose of closing the pouring opening.

5. The container as claimed in claim 2, wherein the operator is an adjustment ring lockable at different rotational positions in order to provide the container with preset measured quantities.

6. The container as claimed in claim 2, wherein the operator comprises an adjusting ring arranged around the pouring opening.

7. The container as claimed in claim 6, wherein a cap is arranged on the adjusting ring for the purpose of closing the pouring opening.

8. The container as claimed in claim 1, wherein the operator comprises an adjusting ring arranged around the pouring opening.

9. The container as claimed in claim 8, wherein a cap is arranged on the adjusting ring for the purpose of closing the pouring opening.

10. The container as claimed in claim 9, further including co-acting protrusions arranged on the inner side of the ring and around the pouring opening for holding the adjusting ring in a set position, and wherein the adjusting ring is deformable in order to disengage the protrusions from each other.

11. The container as claimed in claim 9, further comprising a closure arranged in the inflow opening of the dosing compartment, which closure is coupled to the closable pouring opening such that, when the pouring opening is opened, the inflow opening is closed and, when the pouring opening is closed, the inflow opening is opened.

12. The container as claimed in claim 8, further including co-acting protrusions arranged on the inner side of the ring and around the pouring opening for holding the adjusting ring in a set position, and wherein the adjusting ring is deformable in order to disengage the protrusions from each other.

13. The container as claimed in claim 8, wherein the operator is an adjustment ring and is lockable at different rotational positions in order to provide the container with preset measured quantities.

14. The container as claimed in claim 1, wherein the operator is an adjusting ring lockable at different rotational positions in order to provide the container with preset measured quantities.

15. A container for a fluid, the container comprising:
(a) a storage compartment with a passage opening;
(b) a dosing compartment with a closable pouring opening and with an inflow opening arranged on the passage opening of the storage compartment;
(c) a conduit arranged between the inflow opening and the pouring opening of the dosing compartment, wherein at least one opening is arranged in the wall of the conduit;
(d) an adjusting part arranged in the conduit for at least partially closing the at least one opening in the conduit wall such that the distance between the inflow opening of the dosing compartment and the part of the least one opening left clear can be varied;
(e) an operator for operating the adjusting part, wherein the operator is arranged on the outer side of the container; wherein the operator comprises an adjusting ring arranged around the pouring opening;
(f) a cap arranged on the adjusting ring for the purpose of closing the pouring opening; and
(g) co-acting protrusions arranged on the inner side of the ring and around the pouring opening for holding the adjusting ring in a set position, and wherein the adjusting ring is deformable in order to disengage the protrusions from each other.

16. A container for a fluid, the container comprising:
(a) a storage compartment with a passage opening;
(b) a dosing compartment with a closable pouring opening and with an inflow opening arranged on the passage opening of the storage compartment;
(c) a conduit arranged between the inflow opening and the pouring opening of the dosing compartment, wherein at least one opening is arranged in the wall of the conduit;
(d) an adjusting part arranged in the conduit for at least partially closing the at least one opening in the conduit wall such that the distance between the inflow opening of the dosing compartment and the part of the least one opening left clear can be varied;
(e) an operator for operating the adjusting part, wherein the operator is arranged on the outer side of the container; wherein the operator comprises an adjusting ring arranged around the pouring opening;
(f) a cap arranged on the adjusting ring for the purpose of closing the pouring opening; and
(g) a closure arranged in the inflow opening of the dosing compartment, which closure is coupled to the closable pouring opening such that, when the pouring opening is opened, the inflow opening is closed and, when the pouring opening is closed, the inflow opening is opened.

* * * * *